Feb. 14, 1961    R. L. CURL    2,971,896
ACOUSTIC DETERMINATION OF OPERATING CONDITIONS
Filed Dec. 23, 1957
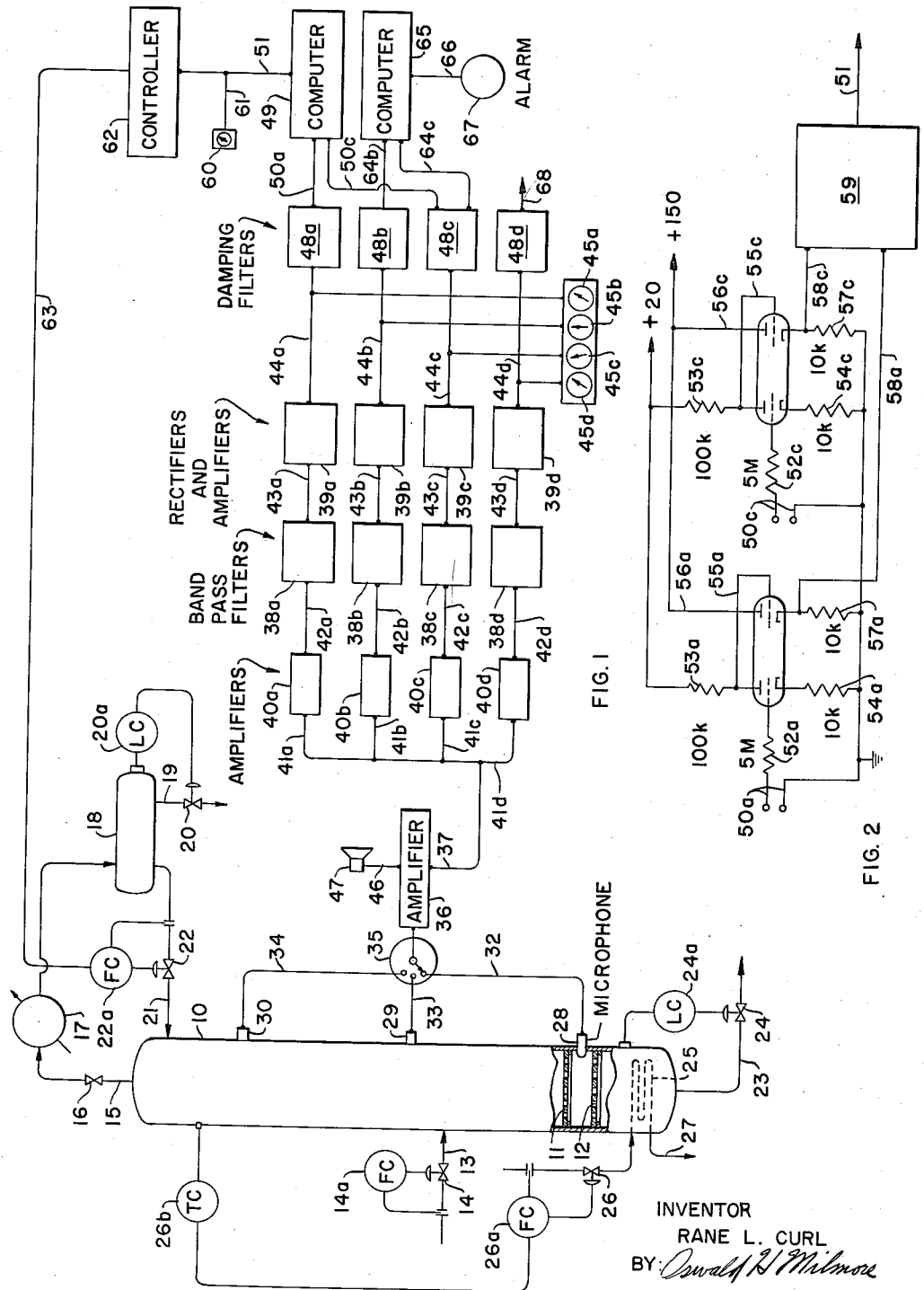
INVENTOR
RANE L. CURL
BY: Oswald H. Milmore
HIS ATTORNEY United States Patent Office 2,971,896
Patented Feb. 14, 1961

2,971,896
ACOUSTIC DETERMINATION OF OPERATING CONDITIONS
Rane L. Curl, Oakland, Calif., assignor to Shell Oil Company, a corporation of Delaware
Filed Dec. 23, 1957, Ser. No. 704,735
8 Claims. (Cl. 202—160)

This invention relates to the operation of processes involving the interaction of a gas phase with a liquid phase, e.g., gas-liquid contacting such as fractional distillation in columns containing contact trays, evaporation, aeration, mixing by flow through orifices or tortuous paths, and separating, as in a cyclone. More particularly, the invention is concerned with a determination of the operating conditions of the process by an analysis of the sonic vibrations generated by the relative motion between the gas and liquid; it is further concerned with the control of such a process on the basis of the analyzed sounds.

In the operation of processes of the type indicated above it is frequently desired to ascertain quickly the physical conditions prevailing in the system and to detect rapidly deviations from optimum or acceptable conditions so that an operator can take the necessary corrective action or so that a controller influencing the operating conditions can be actuated automatically in a corrective direction, either to re-establish the more favorable conditions or to sound an alarm or shut down the process. Existing techniques for this purpose, which are based upon measurement of physical conditions within the apparatus or the physical or chemical nature of the feed and effluent streams or the flow rates in many instances are inconvenient and time-consuming and do not give an immediate indication of the deviation of the operating conditions from that required or standard in the normal operation. Of even greater importance in many processes, as those involving physical actions at several locations in a piece of equipment, is the inability of such techniques to indicate at what particular locality a deviation has occurred.

A more rapid warning of the change in a physical operating condition can, in many processes, be obtained from the sound that is generated in the process. Thus, it is known, according to German Patent No. 945,351, to determine either by a loud speaker or by a voltmeter, the intensity of the sound vibrations in various processes. Also, it is known to detect certain abnormal operating conditions in such processes as grinding in a ball mill or the regeneration of catalyst, by determining the sound intensity and automatically or manually controlling the process when the sound intensity deviates from its normal or optimum value; see U.S. Patents Nos. 2,235,928 and 2,760,184.

It was found, however, that such simple techniques of sound measurements are not capable of detecting many technologically important variations in operating conditions or of giving a clear indication of the prevailing conditions, particularly in processes involving the relative movement between a gas and a liquid, save at certain critical points whereat large changes in sound intensity occur. Further, it was found that the sound intensity does not always vary as a monotonic function of a variable, such as the gas flow rate, but alternately increases and decreases as the variable condition is varied progressively, so that the determination of the prevailing operating condition is obscured and incapable of accurate determination.

It is, therefore, an object of the invention to provide an improved method and apparatus for rapidly determining the prevailing operating condition of gas-liquid flow processes of type mentioned above, and for indicating rapidly deviations in such conditions from a previously prevailing or from an optimum condition, which is based upon an analysis of the sounds generated in the process, so that the course of the process can be followed or that corrective action can be taken by an operator.

It is another object to provide an improved apparatus for automatically correcting the conditions prevailing in a gas-liquid flow process, based upon an analysis of the sounds generated therein.

In summary, according to the invention the vessel within which the gas-liquid flow process is carried out is provided with a transducer, such as a microphone, for detecting the sonic vibrations generated by the process and generating equivalent electrical signals, and the transducer is connected electrically to an electronic analyzer which segregates the electrical signals according to frequency into a plurality of different frequency bands. While it is possible to use narrow bands in accordance with this invention it is, in most cases, preferable to use wider bands, e.g., octave bands, although either wider or narrower bands may be used. The analyzer output is connected to measuring the amplitudes of the electrical signals in the several bands, whereby the amplitude distribution of the signals among the bands and, thereby, the prevailing operating condition is determined.

According to a further feature of the invention there is provided a control unit responsive to the measured amplitudes of two or more of the said bands for actuating a final control means which influences the operating conditions. The control unit may include, for example, a ratio comparator, for determining the ratios between the measured amplitudes of two or more frequency bands.

In both of the complete systems according to the immediately preceding paragraph and in the basic system of the earlier paragraph, it is desirable to provide means for damping the measure amplitudes to produce an output signal or indication which is steady. Thus, it was found that the sound intensities in the several bands are subject to fluctuations even with stable operating conditions, due in part to random or unknown causes.

Having thus indicated the general nature of the invention it will be described in detail with reference to the accompanying drawing forming a part of this specification and showing, by way of example, certain preferred embodiments, wherein:

Figure 1 is a partly sectional elevation view of a fractionating column provided with an acoustic system according to the invention, elements of the control system being shown diagrammatically; and Figure 2 is a schematic circuit diagram of a ratio computer used in Figure 1.

Referring to Figure 1 of the drawing, the invention is shown applied to a fractional distillation column comprising a shell 10 within which are mounted contacting trays 11, e.g., flat trays having slots 12 therein through which liquid descends and gas ascends. The feed stream is admitted through a supply pipe 13 at a rate controlled by a valve 14, which is actuated by a flow controller 14a; overhead vapors are drawn off through a duct 15, which may have a valve 16, condensed in a condenser 17, and collected in a surge tank 18 which may, for example, be at atmospheric pressure. A part of the condensate is withdrawn as the top product through pipe 19 at a rate controlled by a valve 22, which is actuated by a liquid level controller 22a. The bottom product is withdrawn through a pipe 23 at a rate determined by a valve 24 which is actuated by a liquid level controller 24a. Vapors are generated by a suitable reboiler, such as an internal coil 25 to which a thermal fluid is admitted through a valve 26 and from which it is discharged at 27. The valve 26 is actuated by a flow controller 26a controlled by a temperature controller 26b.

As is well understood in the distillation art, liquid collects on each of the trays 11 and descends through the slots 12 at rates which are restricted by the upflow of the vapor through the same slots. This vapor engages the liquid and disrupts it into droplets which are carried up as a spray into the inter-tray space and fall again onto the tray. At any established operating condition a characteristic sound is generated at each tray. It is important to maintain a suitable operating condition. Thus, when the column loading exceeds 100% of capacity flooding occurs while insufficient loading results in insufficient or unbalanced disruption of the liquid and leads to very low contacting efficiencies.

One or more microphones 28, 29 and 30 are mounted in sealed relation in the column wall and may be at least partially encased in liquid-proof, pliable shrouds, e.g., made of rubber or a thin corrosion-resistant metal. For simplicity, only one electrical conductor circuit is shown in Figure 1, interconnecting the various circuit elements, it being understood that there is a common ground return circuit or that each conductor circuit shown may consist of a pair of conductors. Each of the microphones is connected by a separate circuit 32, 33 or 34 to a selector switch 35 which may be of any suitable type designed to connect a selected microphone to a linear amplifier 36. The amplifier output is connected by a circuit 37 to a noise spectrum analyzer which includes a plurality of band-pass filters 38a–38d and a corresponding plurality of detectors 39a–39d; it may, if desired, further include a plurality of linear amplifiers 40a—40d, which may be in addition to or in lieu of the amplifier 36. Thus, the circuit 37 is connected by branch circuits 41a–41d to the inputs of the last-mentioned amplifiers; the outputs of the amplifiers are connected by circuits 42a–42d to the inputs of the filters; and the filter outputs are connected by circuits 43a–43d to the inputs of the detectors 39a–39d which may, if desired, be of a type that effect linear amplification. The detectors convert the audio frequency signals in the respective circuits 43a–43d into direct current signals which are proportional to the audio signal amplitudes and their outputs are connected by circuits 44a–44d to electrical measuring means in the form of indicators 45a–45d, respectively, e.g., voltmeters or ammeters. These are preferably damped to give steady indications despite fluctuations in the rectified signals. The amplifier 36 may be further connected by a circuit 46 to a loud speaker 47 to give an audible indication of the sound within the column in the vicinity of the selected microphone.

The components of the noise spectrum analyzer may be of any suitable or standard design. Such components being known per se, they are not described herein in detail. Each of the filters 38a–38d has the characteristic of passing unattenuated only electrical audio frequency signals falling within a limited frequency range. The number and widths of such ranges or bands will be different for different types of process equipment and even for different designs of the same type, e.g., they will vary for distillation columns of different dimensions; for this reason it is usually necessary to determine empirically in any given application which are the most useful and the analyzer need include only such bands. It is, therefore, evident, that four bands is merely illustrative and that a greater or smaller number may be used. By way of example, in a specific application eight bands were used, of which the first covered the range of 20–75 cycles per sec. and the other successive octaves including 4800 to 9600 cycles per sec. in the highest octane. It is, of course, not essential that the bands be consecutive so as to pass collectively all of the frequencies in the full range including the audio frequencies to be analyzed. Similarly, the bands may be wider or narrower than one octave.

It is seen that the analyzer provides a series of band-pass filters, each having an associated rectifier to obtain a direct current signal equivalent to the amplitude of the sound-frequency electrical vibrations obtained from the band-pass filters, and that these direct current signals are measured by the indicators. These signals tend in many cases to become unsteady and to undergo regular or random variations in amplitude, possibly due to the generation of beats between two or more frequencies included with the same band, and damping of the amplitudes is, therefore, often desirable. This can usually be effected by using damped indicators; however, it is also possible to damp the electrical signals by introducing damping units such as those described hereinafter.

By observing the dials of the indicators 45a–45d an operator can recognize the operating condition in the column and take appropriate corrective action, by adjusting one or more of the controllers 14a, 22a and 26b.

According to a further, optional feature, the analyzer may be connected to a computing unit which replaces or supplements the indicators 45a–45d. It is in most cases desirable that the computing unit be connected through electrical damping elements 48a–48d, which are connected respectively to the circuits 44a–44d to smooth out the above-mentioned recurring or random variations in signal amplitudes. These damping filters may be of known design; their time constants may be, e.g., 0.2 to 10 seconds.

The computing unit 49 may be any device for comparing the direct current signals and generating a resultant signal which is a significant function of the signal amplitudes in two or more bands, such as the ratio between two signal amplitudes or between one signal amplitude and the product of two others, or the sum or difference between signal amplitudes. The particular function will, in any specific application, be determined by observing the effect of changes in the process operating conditions on the several signal amplitudes and discerning a function of such amplitudes which assumes valves which are uniquely or recognizably associated with significant operating conditions. Two of such determinations are described hereinafter.

In one illustrative embodiment, the computing unit determines the ratio of the amplitudes of two selected frequency bands, e.g., those passed by the filters 38a and 38c. To this end the unit 49 is connected by circuits 50a nd 50c to the outputs of the damping filters 48a and 48c, respectively, and produces in the output circuit 51 a direct current signal which varies as a monotonic function of the said ratio. The unit 49 may contain, for example, any suitable differential amplifier having logarithmic response by utilizing the retarded field characteristic of a triode vacuum tube, connected to a device which can obtain the difference of the logarithms of the two signals; or an electro-mechanical device, of a type such as are described in the literature; see Korn and Korn, "Electronic Analog Computers," 1952, chapter 6.

One specific example of the logarithmic response circuit is shown in Figure 2, in which each of the circuits 50a and 50c is connected through a 5-megohm resistor 52a or 52c to the grid of a triode having the plate connected through a 100,000-ohm resistor 53a or 53c to a 20-volt potential and the cathode connected through a 10,000-ohm-resistor 54a or 54c to ground. The plates assume potentials which vary logarithmically with the applied input potentials from circuits 50a and 50c and the plate potentials are applied via wires 55a or 55c to the grids of cathode-follower amplifier triodes. The latter have 150 volts applied to their plates by wires 56a or 56c and their cathodes connected to ground via 10,000-ohm cathode resistors 57a or 57c to yield output voltages in circuits 58a and 58c which are similarly logarithmic functions of the signals. The difference of the voltages in these output circuits is the logarithm of the ratio. A linear D.C. amplifier 59 may be used to amplify the output of the logarithmic circuit or to shift voltage levels to make the output compatible with the input requirements of electronic controllers. Such devices are described, for example, by Korn and Korn, op. cit., and by Greenwood, Holdam and Macrae, "Electronic Instruments" (1948), chapter 3, and need not be described herein.

The determined logarithm of the ratio may be indicated on an instrument 60 which is connected to the output circuit 51 by a circuit 61 to enable an operator to control the column. It is understood that the indicator may be a voltmeter and may yield either a direct reading of the ratio or a function thereof, e.g., a value proportional to the logarithm, or the ratio itself.

For fully automatic control the circuit 51 is connected to an electronic controller 62 of standard design but with provision for accepting the differential voltage from the computer 49 which, through an electrical or pneumatic control line 63, controls the set point of one of the column controls, as described above for manual operation, such as the flow controller 22a for varying the reflux to the column.

It is often found that certain critical or extreme operating conditions are made apparent by a ratio of signal amplitudes other than those used for controlling the normal operation of the process. The direct current signals from those bands, e.g., from the band pass filters 38b and 38c, are connected by circuits 65b and 64c to a computer 65 which may be like the computer 49 and having an output circuit 66 carrying a signal which is a function of the ratio of the signals in the circuits 64b and 64c. The output circuit is connected to an alarm 67.

*Example*

The operation of the system will be described with reference to the following data obtained from an operating test distillation column using grid trays of the type mentioned for the column 10. A microphone was rigidly supported, without contact with the column, through a hole cut in the column wall between 18.7% free area stamped three foot square trays mounted one foot apart. Back pressure within the microphone was equalized to the column pressure and the noise was recorded on a tape recorder under varied operating conditions. For each liquid rate, $q$, the gas rate was varied to operate the column at different percentages of the capacity. The recorded noise was analyzed into the eight bands previously described and the measured amplitudes for the several bands were computed. From these the data for bands (1), (3) and (7), covering the frequencies given in the following table, were found to be significant to the operating condition of the column. Signal amplitudes are expressed in this table in terms of decibels relative to the signals in channel 5.

| $q$, g.p.m. | Percent of Capacity | db Values of Amplitudes in Bands | | | db Values of Ratios | |
|---|---|---|---|---|---|---|
| | | (1) 20–75 c.p.s. | (3) 150–300 c.p.s. | (7) 2,400–4,800 c.p.s. | $R_{37}$ | $R_{17}$ |
| 25 | 0 | −8 | −4 | −6 | +2 | −2 |
| | 33.9 | −6 | −2 | −9 | +7 | +3 |
| | 43.7 | +19 | +2 | −8 | +10 | +27 |
| | 78.9 | +16 | +6 | −14 | +20 | +30 |
| | 90.4 | +7 | +7 | −17 | +24 | +24 |
| 100 | 0 | −10 | −2 | −7 | +5 | −3 |
| | 35.4 | −9 | −2 | −6 | +4 | −3 |
| | 46.6 | +3 | +2 | −9 | +11 | +12 |
| | 60.9 | +1 | +5 | −11 | +16 | +12 |
| | 75.6 | +8 | +9 | −10 | +19 | +18 |
| | 88.6 | +9 | +10 | −12 | +22 | +21 |
| | 96.0 | +5 | +11 | −11 | +22 | +16 |
| 300 | 0 | +2 | +4 | −5 | +9 | +7 |
| | 58.7 | +2 | +5 | −9 | +14 | +11 |
| | 66.3 | +10 | +9 | −10 | +19 | +20 |
| | 72.6 | +9 | +9 | −12 | +21 | +21 |
| | 91.1 | +10 | +12 | −11 | +23 | +21 |

The ratios in the last two columns were computed. Thus, $R_{37}$ is the ratio of the amplitude of the signal in band 3 to that in band 7, while $R_{17}$ is the ratio of the amplitude of the signals in bands 1 and 7.

The band pass filters 38a, 38b and 38c are selected to correspond to the bands 3, 1 and 7, respectively, from which it is evident that the computer 49 determines the ratio $R_{37}$ and the computer 65 the ratio $R_{17}$.

Considering first the ratio $R_{37}$, it is evident that it increases with the percent capacity at which the column is operating. If, for example, the liquid rate is in the range of 100 to 300 gallons per minute and it is desired to operate the column at 69% of capacity, the controller 62 is set to maintain the ratio $R_{37}$ at 20 db. Thus, when $R_{37}$ rises above this value the controller 62 operates the flow controller 22a to decrease the flow of reflux through the valve 22, thereby reducing the loading in the column. Similarly, the reflux is increased when $R_{37}$ falls below the value 20 lb. Although, as is evident from the tabulated data, the control ratio corresponding to a given capacity shifts somewhat with the liquid flow rate (thus, $R_{37}$ for 69% capacity is slightly less than 20 db. at 25 gallons per minute) this shift is sufficiently small over the range of liquid flows encountered in normal column operations to permit the above-described control operation to be effective. It is evident that when operations at other capacities are desired other values of this ratio may be selected and that the ratio between the signals in other bands may be used when they show a more consistent trend over the range of capacities in interest. Thus, the output signal in circuit 68, from the band-pass filter 38d, which is not used in the above operation, may be used.

Considering next the ratio $R_{17}$, it is evident that this falls off sharply at low capacities, which indicates conditions of no dispersion and, hence, inefficient contacting. In such conditions it is desired to sound an alarm. Thus, the alarm 67 can be adjusted to give a warning whenever this ratio falls below +10 db.

I claim as my invention:

1. Apparatus for interaction between a gaseous and a liquid phase which comprises a vessel adapted to contain said phases and including means to effect between said phases such relative motion as establishes certain physical operating conditions which generate characteristic sonic vibrations, a transducer acoustically coupled to said phases for receiving said sonic vibrations and emitting equivalent electrical signals, an electronic analyzer connected electrically to said transducer and including circuit means for segregating the electrical signals according to frequency into a plurality of different frequency bands, and means connected electrically to said analyzer for determining the amplitudes of the signals within a plurality of different bands.

2. In combination with the apparatus according to claim 1, means for comparing the measured amplitudes of the electrical signals within different frequency bands, and means for indicating the relation between the compared amplitudes.

3. In combination with the apparatus according to claim 1, means for controlling the relative motion between said phases within the vessel in accordance with the said measured amplitudes of a plurality of different frequency bands.

4. In combination with the apparatus according to claim 1, means for determining the ratio between at least two of the measured amplitudes of different frequency bands.

5. In combination with the apparatus according to claim 4, means for controlling the relative motion between said phases within the vessel in accordance with the determined ratio.

6. In combination with the apparatus according to claim 1, means for damping the measured amplitudes of the signals.

7. In combination with the apparatus according to claim 1, means for determining changes in the measured amplitudes of a plurality of said different frequency bands.

8. Apparatus for effecting contact between a gas and a liquid which comprises a tank containing a contacting tray which is adapted to collect liquid and which has openings therein for the upward flow of gas through the collected liquid, means for supplying liquid to the tray and gas to the space beneath the tray at controlled flow rates, whereby to establish certain physical flow conditions at the tray which generate characteristic sonic vibrations, a transducer acoustically coupled to the space within the vessel adjoining the tray for receiving said sonic vibrations and emitting equivalent electrical signals, an electronic analyzer connected electrically to said transducer and including circuit means for segregating the electrical signals according to frequency into a plurality of different frequency bands, and means connected electrically to said analyzer for determining the amplitudes of the signals within a plurality of different bands.

References Cited in the file of this patent

UNITED STATES PATENTS

| | | |
|---|---|---|
| 2,492,062 | Potter | Dec. 20, 1949 |
| 2,614,645 | Whilhelm | Oct. 21, 1952 |
| 2,668,365 | Hogin | Feb. 9, 1954 |
| 2,746,480 | Hildyard | May 22, 1956 |
| 2,765,219 | Shawhan | Oct. 2, 1956 |